United States Patent Office 3,338,714
Patented Aug. 29, 1967

3,338,714
PHOTOGRAPHIC SUPERSENSITIZED SILVER
HALIDE EMULSIONS
Geoffrey Ernest Ficken, Douglas James Fry, and Elvin
Frederick William Thurston, Ilford, Essex, England,
assignors to Ilford Limited, Ilford, Essex, England, a
British company
No Drawing. Filed Aug. 10, 1964, Ser. No. 388,684
Claims priority, application Great Britain, Aug. 26, 1963,
33,676/63
7 Claims. (Cl. 96—104)

This invention relates to photographic light-sensitive materials and more particularly to the manufacture of dye-sensitised photographic silver halide emulsions.

Photographic silver halide emulsions have a certain natural sensitivity to light, but this is restricted to a short range of wavelengths in the ultra-violet and/or blue regions of the spectrum. The effect of incorporating a sensitising dye is to impart to the emulsion sensitivity to light of other wavelengths. It has been known for some years that by incorporating in the emulsion, together with a sensitising dye, a second substance which may or may not itself be a sensitiser, there may sometimes be imparted to the emulsion an additional sensitivity beyond that which can be regarded as the sum effect of the separate substances. Combinations of sensitising dye and another substance which give this latter result are known as super-sensitising combinations.

The present invention is based on the discovery of a new supersensitising combination of the type just referred to.

According to the present invention there is provided a photographic silver halide emulsion which contains a sensitising dye of the general Formula I:

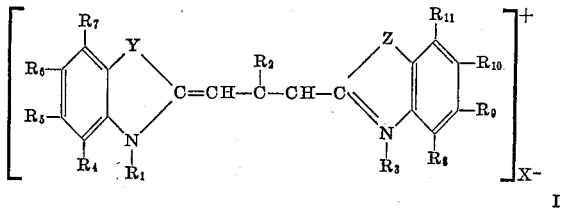

I where Y represents a sulphur or selenium atom, Z represents a sulphur or selenium atom, $R_1$ and $R_3$ are the same or different and are alkyl groups or one is an alkyl group and the other is a carboxyalkyl, carbamoylalkyl or sulphoalkyl group, $R_2$ is hydrogen or an alkyl group, $R_5$, $R_6$, $R_9$, and $R_{10}$ are the same or different and each represents a hydrogen or a halogen atom, or an alkyl, aryl, hydroxy or alkoxy group, $R_4$ and $R_8$ are the same or different and each represents a hydrogen atom, or, together with $R_5$ and $R_9$, form part of a benzene ring, $R_7$ and $R_{11}$ are the same or different and each represents a hydrogen atom or, together with $R_6$ and $R_{10}$, form part of a benzene ring, and X is an anion, together with a dye of the general Formula II:

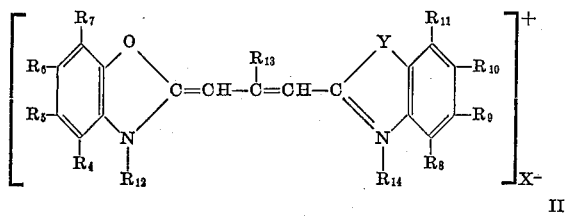

II where $R_4$, $R_5$, $R_6$, $R_7$, $R_8$, $R_9$, $R_{10}$, $R_{11}$, Y and X have the meanings assigned to them above, $R_{12}$ is an alkyl group, $R_{13}$ is a hydrogen atom or an alkyl group, and $R_{14}$ is an alkyl group or a group A–Q where A is a straight or branched alkylene chain containing 1 to 6 carbon atoms and Q is an amide, carboxylic acid or sulphonic acid. (Where Q is a sulphonic acid the dye generally exists as the anhydro form where X is an hydroxide ion).

In the preferred embodiment of the invention Q in Formula II is a sulphonic acid group.

By the use of a combination of dyes as just set forth a valuable supersensitising effect is obtained as illustrated by the specific examples which are set forth later herein.

Referring to the general Formulae I and II it is to be noted that where alkyl groups are referred to these are preferably lower alkyl groups, i.e. containing 1 to 4 carbon atoms, though they may be higher alkyl groups. Where aryl groups are referred to these may be phenyl or naphthyl and may include substituent groups such as alkyl groups or halogen atoms which do not destroy the sensitising action of the compounds.

The symbol X represents any anion (and may be different in the different classes of compounds) but generally will be a halide ion or a sulphate, sulphonate, aryl sulphonate or perchlorate ion.

The following are illustrative examples of the preparation of supersensitised photographic silver halide emulsions according to the invention:

*Dyes of Formula I*

A. Bis(3-ethyl - 2 - naphtho[1,2d]thiazole) β - methyltrimethincyanine chloride.

B. Bis(5 - chlro - 3 - methyl-2-benzothiazole) β - ethyltrimethincyanine iodide.

C. Bis(3-ethyl-2-naphtho[1,2]thiazole) β-ethyltrimethincyanine chloride.

D. Bis-(5 - chloro - 3 - ethyl-2 - benzothiazole) trimethincyanine chloride.

E. Bis(3-ethyl - 2 - benzothiazole) β-methyltrimethincyanine bromide.

F. Bis-(3-ethyl-5-methoxy-2-benzothiazole) β-methyltrimethincyanine bromide.

G. Bis-(3-ethyl-5-methoxy - 2 - benzothiazole) β-ethyltrimethincyanine iodide.

H. Bis(3 - ethyl - 5 - methyl-2 - benzothiazole) β-ethyltrimethincyanine iodide.

I. Bis-(5-chloro-3-ethyl - 2 - benzothiazole) β - methyltrimethincyanine chloride.

J. Bis-(5 - chloro - 3 - methyl-2-benzothiazole) β-ethyltrimethincyanine iodide.

K. (3-2'-carbamoylethyl-5-methoxy-2-benzothiazole) (3-ethyl-5-methyl - 2 - benzoselenazole) β-ethyl-trimethincyanine perchlorate.

L. Bis-(3 - ethyl - 5 - phenyl-2-benzothiazole) β-ethyltrimethincyanine iodide.

M. Anhydro-(3-3'-sulphopropyl - 5,6 - dimethyl-2-benzothiazole) (3-ethyl-2-benzothiazole) β-methyltrimethincyanine hydroxide.

N. Bis-(3-ethyl-5-methyl - 2 - benzothiazole) β-methyltrimethincyanine bromide.

P. (3-2'-carboxyethyl-5-methyl - 2 - benzoselenazole) (5-chloro-3-ethyl-2-benzothiazole) β-ethyltrimethincyanine iodide.

Q. Bis-(3-ethyl-2-benzoselenazole) β - ethyltrimethincyanine iodide.

R. Bis-(3-ethyl - 2 - benzoselenazole) β-methyltrimethincyanine iodide.

Dyes of Formula II (1) Anhydro(5-phenyl-3-ethyl-2-benzoxazole) (3-3'- sulphopropyl - 2 - benzothiazole) β-ethyltrimethincyanine hydroxide.
(2) (5-phenyl-3-ethyl - 2 - benzoxazole) (3 - ethyl-2-benzothiazole) β-ethyltrimethincyanine iodide.
(3) (5 - phenyl-3-ethyl - 2 - benzoxazole) (3-2'-carboxyethyl-2-benzothiazole) β-ethyltrimethincyanine iodide.
(4) (5-phenyl-3-ethyl - 2-benzoxazole) (3-2'-carbamoylethyl-2-benzothiazole) β-ethyltrimethincyanine iodide.
(5) (5-phenyl-3-methyl-2-benzoxazole) (3-2'-carbamoylethyl-2-benzothiazole) β-ethyltrimethincyanine iodide.
(6) Anhydro (5-phenyl - 3 - ethyl-2-benzoxazole) (3-3'-sulphopropyl-2-benzothiazole) trimethincyanine hydroxide.
(7) Anhydro (5-phenyl-3-ethyl-2-benzoxazole) (3-3'-sulphopropyl-2-benzothiazole) β - methyltrimethincyanine hydroxide.
(8) (3-ethyl-2-benzoxazole) (3-2'-carbamoylethyl-2-benzothiazole) β-ethyltrimethincyanine iodide.
(9) Anhydro-(3 - 4' - sulphobutyl - 2-benzothiazole) (3-ethyl-5-phenyl-2-benzoxazole) β-ethyltrimethincyanine hydroxide.
(10) Anhydro-(3-carboxymethyl - 2 - benzothiazole) (3-ethyl-5-phenyl - 2 - benzoxazole) β-ethyltrimethincyanine hydroxide.
(11) (3-carbamoylmethyl-2-benzothiazole) (3 - ethyl-5-phenyl-2-benzoxazole) β-ethyltrimethincyanine iodide.
(12) Anhydro-(3-2'-sulphoethyl - 2 - benzothiazole) (3-ethyl-5-phenyl-2-benzoxazole) β-ethyl-trimethincyanine hydroxide.
(13) (3-2'-carboxyethyl-5-chloro - 2 - benzothiazole) (3-ethyl-5-phenyl-2-benzoxazole) β-ethyl-trimethincyanine iodide.
(14) Anhydro - (3 - 3'-sulphopropyl-5,6-dimethyl-2-benzothiazole) (3-ethyl-5-phenyl-2-benzoxazole) β-ethyltrimethincyanine hydroxide.
(15) Anhydro - (3 - 2'-carboxyethyl-5-methoxy-2-benzothiazole) (3-ethyl-5-phenyl-2-benzoxazole) β-ethyltrimethincyanine hydroxide.
(16) Anhydro-(3-2'-sulphoethyl - 2 - benzothiazole) (3-methyl-5-phenyl - 2 - benzoxazole) β-ethyl-trimethincyanine hydroxide.
(17) (3-2'-carboxyethyl - 5,6-dimethoxy - 2 - benzothiazole) (3 - ethyl - 5 - phenyl - 2 - benzoxazole) β-ethyltrimethincyanine bromide.
(18) (3-2'-carboxyethyl - 2 - benzothiazole) (3 - ethyl-5-methoxy-2-benzoxazole) β-ethyltrimethincyanine bromide.
(19) Anhydro-(3-2'-sulphoethyl - 2 - benzothiazole) (5-methoxy-3-methyl - 2 - benzoxazole) β-ethyl-trimethincyanine hydroxide.
(20) Anhydro-(3-3' - sulphopropyl-2-benzothiazole) (5-methoxy-3-methyl - 2 - benzoxazole) β-ethyl-trimethincyanine hydroxide.
(21) (3-ethyl-6-hydroxy - 2 - benzothiazole) (3 - ethyl-5-phenyl-2-benzoxazole) β-ethyltrimethincyanine iodide.
(22) Anhydro [3-(1-methyl - 4 - sulphobutyl)-2-benzothiazole] (3-ethyl-5-phenyl-2-benzoxazole) β-ethyltrimethincyanine hydroxide.
(23) Anhydro - [3-3'-sulphopropylnaphtho(1,2d) thiazole-2] [3-ethyl-5-phenyl - 2 - benzoxazole] β-ethyltrimethincyanine hydroxide.

The first three combinations of a dye of Formula I and a dye of Formula II were added to a fast gelatino silver iodobromide emulsion containing 3.2 mol. percent of silver iodide, all the other combinations of dyes were added to a medium speed gelatino silver iodobromide emulsion containing 2.7 mol percent of silver iodide.

It was found that the dyes could be added together or separately and either before or after the customary addition of general sensitising agents such as sulphur compounds and gold salts. Where appropriate, control tests were made with either one or the other of the dyes used alone.

The following table illustrates the effect of the supersensitisation. Speeds were measured to light passing a tri-colour red filter.

| Formula I dye addition per 1.5 g. mol Ag. | Formula II dye addition per 1.5 g. mol Ag. | Relative log speed of emulsion |
|---|---|---|
| B 0.03 | | 3.60 |
| B 0.03 | (1) 0.05 | 4.70 |
|  | (1) 0.05 | 3.76 |
| C 0.03 | | 4.23 |
| C 0.03 | (1) 0.05 | 4.64 |
|  | (1) 0.05 | 3.76 |
| A 0.035 | | 4.56 |
| A 0.035 | (6) 0.12 | 4.68 |
|  | (6) 0.12 | 3.02 |
| A 0.035 | | 3.38 |
| A 0.035 | (8) 0.1 | 3.70 |
|  | (8) 0.11 | 1.96 |
| A 0.25 | | 3.17 |
| A 0.25 | (1) 0.075 | 3.89 |
| A 0.25 | (7) 0.075 | 3.40 |
|  | (1) 0.075 | 3.14 |
|  | (7) 0.075 | 2.60 |
| A 0.025 | | 3.15 |
|  | (2) 0.075 | 3.70 |
|  | (2) 0.075 | 2.93 |
|  | (3) 0.075 | 3.80 |
| A 0.025 | (3) 0.075 | 2.90 |
|  | (4) 0.075 | 3.78 |
|  | (4) 0.075 | 2.74 |
| A 0.025 | (5) 0.075 | 3.75 |
|  | (5) 0.075 | 2.98 |
| D 0.025 | | 2.38 |
| D 0.025 | (1) 0.075 | 3.75 |
|  | (1) 0.075 | 3.13 |
| A 0.025 | | 3.15 |
| A 0.025 | (9) 0.075 | 3.84 |
|  | (9) 0.075 | 2.97 |
| A 0.025 | | 3.15 |
| A 0.025 | (10) 0.075 | 3.51 |
|  | (10) 0.075 | 3.06 |
| A 0.025 | | 3.15 |
| A 0.025 | (11) 0.075 | 3.65 |
|  | (11) 0.075 | 3.15 |
| A 0.025 | | 3.15 |
| A 0.025 | (12) 0.075 | 3.86 |
|  | (12) 0.075 | 2.84 |
| A 0.025 | | 3.20 |
| A 0.025 | (13) 0.075 | 3.81 |
|  | (13) 0.075 | 3.45 |
| A 0.025 | | 2.82 |
| A 0.025 | (14) 0.075 | 3.59 |
|  | (14) 0.075 | 3.20 |
| A 0.025 | | 3.20 |
| A 0.025 | (15) 0.075 | 3.89 |
|  | (15) 0.075 | 3.62 |
| A 0.025 | | 3.17 |
| A 0.025 | (16) 0.075 | 3.90 |
|  | (16) 0.075 | 3.04 |
| A 0.025 | | 2.82 |
| A 0.025 | (17) 0.075 | 3.07 |
|  | (17) 0.075 | 2.81 |
| A 0.025 | | 3.15 |
| A 0.025 | (18) 0.075 | 3.83 |
|  | (18) 0.075 | 3.51 |
| A 0.025 | | 3.15 |
| A 0.025 | (19) 0.075 | 3.84 |
|  | (19) 0.075 | 3.30 |
| A 0.025 | | 3.15 |
| A 0.025 | (20) 0.075 | 3.94 |
|  | (20) 0.075 | 3.63 |
| A 0.025 | | 2.82 |
| A 0.025 | (21) 0.075 | 3.25 |
|  | (21) 0.075 | 3.20 |
| A 0.025 | | 3.25 |
| A 0.025 | (22) 0.075 | 3.92 |
|  | (22) 0.075 | 3.32 |
| A 0.025 | | 3.25 |
| A 0.025 | (23) 0.075 | 3.92 |
|  | (23) 0.075 | 3.77 |
| E 0.025 | | 3.27 |
| E 0.025 | (20) 0.075 | 3.70 |
|  | (20) 0.075 | 3.65 |
| F 0.025 | | 2.75 |
| F 0.025 | (20) 0.075 | 3.80 |
|  | (20) 0.075 | 3.55 |
| G 0.025 | | 3.08 |
| G 0.025 | (20) 0.075 | 3.95 |
|  | (20) 0.075 | 3.55 |
| H 0.025 | | 3.35 |
| H 0.025 | (20) 0.075 | 3.98 |
|  | (20) 0.075 | 3.55 |
| I 0.025 | | 3.25 |
| I 0.025 | (20) 0.075 | 3.85 |
|  | (20) 0.075 | 3.55 |
| J 0.025 | | 3.55 |
| J 0.025 | (20) 0.075 | 3.87 |
|  | (20) 0.075 | 3.55 |
| K 0.025 | | 3.63 |
| K 0.025 | (20) 0.075 | 3.98 |
|  | (20) 0.075 | 3.65 |
| L 0.025 | | 3.28 |
| L 0.025 | (20) 0.075 | 3.78 |
|  | (20) 0.075 | 3.65 |

| Formula I dye addition per 1.5 g. mol Ag. | Formula II dye addition per 1.5 g. mol Ag. | Relative log speed of emulsion |
|---|---|---|
| M 0.025 | | 3.43 |
| M 0.025 | (20) 0.075 | 3.76 |
| | (20) 0.075 | 3.65 |
| N 0.025 | | 3.20 |
| N 0.025 | (20) 0.075 | 3.85 |
| | (20) 0.075 | 3.55 |
| P 0.025 | | 3.80 |
| P 0.025 | (20) 0.075 | 4.00 |
| | (20) 0.075 | 3.65 |
| Q 0.025 | | 2.75 |
| Q 0.025 | (20) 0.075 | 3.75 |
| | (20) 0.075 | 3.55 |
| R 0.025 | | 3.17 |
| R 0.025 | (20) 0.075 | 3.70 |
| | (20) 0.075 | 3.55 |

The preferred combinations of dyes of Formula I and dyes of Formula II are: Bis (3-ethyl-2-naphtho [1,2d] thiazole)β-methyl trimethincyanine chloride and anhydro (5 phenyl-3-ethyl-2-benzoxazole) (3-3′-sulphopropyl - 2 - benzothiazole)β - ethyltrimethincyanine hydroxide, Bis (3-ethyl-2-naphtho [1,2d]thiazole)β-methyl trimethincyanine chloride and anhydro-(3-3′-sulphopropyl-2-benzothiazole) (5-methoxy-3-methyl-2-benzoxazole)β-ethyltrimethincyanine hydroxide, Bis-(3-ethyl-5-methyl-2 benzothiazole)β-ethyltrimethincyanine iodide and anhydro - (3-3′ - sulphopropyl - 2 - benzothiazole) (5 - methoxy - 3-methyl - 2 - benzoxazole)β - ethyltrimethincyanine hydroxide, Bis (3-ethyl-2-naphtho [1-,2]thiazole)β-methyltrimethincyanine chloride and (3-2′-carboxyethyl-2 - benzothiazole) (3-ethyl-5-methoxy-2-benzoxazole)β-ethyltrimethincyanine bromide, Bis (3-ethyl-2-naphtho [1-2d]thiazole)β-methyl trimethincyanine chloride and anhydro - (3 - 2′ - sulphoethyl - 2 - benzothiazole)(5-methoxy - 3 - methyl - 2 - benzoxazole)β-ethyltrimethincyanine hydroxide.

We claim as our invention:

1. A photographic silver halide emulsion which contains a sensitizing dye of the formula

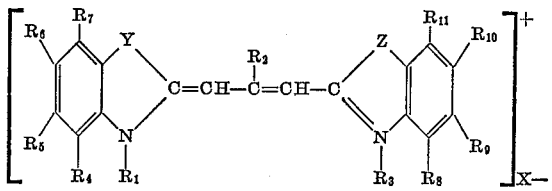

where Y and Z are selected from the class consisting of sulphur and selenium, at least one of the groups $R_1$ and $R_3$ are alkyl, the other group being selected from the class consisting of alkyl, carboxyalkyl, carbamoylalkyl and sulphoalkyl, $R_2$ is selected from the group consisting of hydrogen and alkyl, $R_5$, $R_6$, $R_9$ and $R_{10}$ taken separately are each selected from the class consisting of a hydrogen atom, a halogen atom, an alkyl group, an aryl group, a hydroxy group and an alkoxy group, $R_4$ and $R_8$ taken separately each represent a hydrogen atom, $R_4$ and $R_6$ taken together form part of a benzene ring, $R_8$ and $R_9$ taken together form part of a benzene ring, $R_7$ and $R_{11}$ taken separately each represent a hydrogen atom, $R_7$ and $R_6$ taken together form part of a benzene ring, $R_{11}$ and $R_{10}$ taken together form part of a benzene ring and X is an anion, together with a dye of the formula:

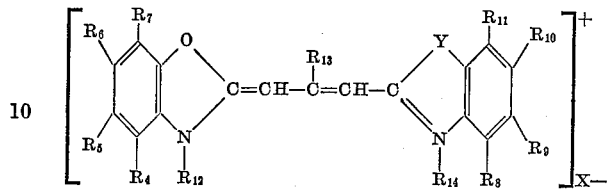

where $R_4$, $R_5$, $R_6$, $R_7$, $R_8$, $R_9$, $R_{10}$, $R_{11}$, Y and X have the meanings asigned to them above, $R_{12}$ is an alkyl group, $R_{13}$ is selected from the class consisting of a hydrogen atom and an alkyl group and $R_{14}$ is selected from the class consisting of an alkyl group and a group A–Q where A is selected from the class consisting of straight and branched alkylene chains containing from 1 to 6 carbon atoms and Q is selected from the class consisting of an amide, a carboxylic acid and a sulphonic acid group.

2. A photographic silver halide emulsion as in claim 1, wherein $F_{14}$ in the second formula contains a sulphonic acid group and the dye is in the anhydro form and X is an hydroxide ion.

3. A photographic silver halide emulsion which contains bis (3-ethyl-2-naphtho [1,2d]thiazole)β-methyl-trimethincyanine chloride and anhydro(5-phenyl-3-ethyl-2-benzoxazole)(3 - 3′ - sulphopropyl - 2 - benzothiazole)β-ethyl-trimethincyaninehydroxide.

4. A photographic silver halide emulsion which contains bis (3-ethyl-2-naphtho [1,2d]thiazole)β-methyl-trimethincyanine chloride and anhydro-(3-3′-sulphopropyl-2 - benzothiazole)(5 - methoxy - 3 - methyl - 2 - benzoxazole)β-ethyltrimethincyanine hydroxide.

5. A photographic silver halide emulsion which contains bis - (3 - ethyl - 5 - methyl - 2 - benzothiazole)β-ethyltrimethincyanine iodide and anhydro-(3-3′-sulphopropyl - 2 - benzothiazole)(5 - methoxy - 3 - methyl - 2-benzoxazole)β-ethyltrimethincyanine hydroxide.

6. A photographic silver halide emulsion which contains bis (3-ethyl-2-naphtho [1,2d]thiazole)β-methyl-trimethincyanine chloride and (3-2′-carboxyethyl-2-benzothiazole)(3 - ethyl - 5 - methoxy - 2 - benzoxazole)β-ethyltrimethincyanine bromide.

7. A photographic silver halide emulsion which contains bis-(3-ethyl-2-naphtho [1,2d]thiazole)β-methyl-trimethincyanine chloride and anhydro-(3-2′-sulphoethyl-2-benzothiazole)(5 - methoxy - 3 - methyl - 2 - benzoxazole)β-ethyltrimethincyanine hydroxide.

References Cited
UNITED STATES PATENTS 2,378,917   6/1945   Fallesen et al. _____ 96—104
2,973,264   1/1961   Nys et al. _____ 96—104

J. TRAVIS BROWN, *Primary Examiner.*